3,024,754
PHASE-DIFFERENCE CONTROL FOR ELECTRO-ACOUSTIC STEERING SYSTEMS
Paul Cooke Gardiner, Scotia, N.Y., assignor, by mesne assignments, to the United States of America as represented by the Secretary of the Navy
Filed June 5, 1950, Ser. No. 166,286
5 Claims. (Cl. 114—23)

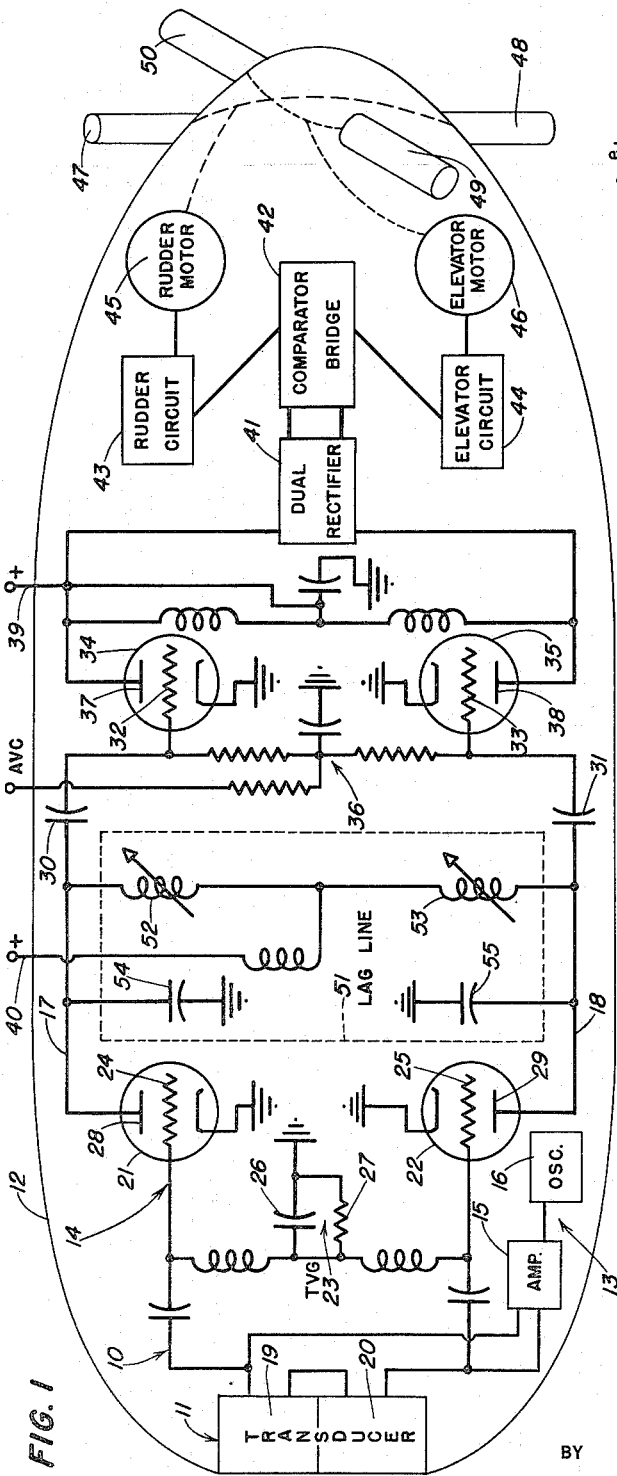

The invention relates to improvements in target detection systems and more specifically to an improved automatic electroacoustic echo-controlled system for steering marine torpedoes toward a source of reflected compressional wave energy.

One method of finding the direction of a source of wave energy is to measure the phase difference between oscillatory electric signals generated by spaced transducers exposed to the wave energy. The phase difference between these oscillatory electric signals in separate channels may be converted, by means of a phase-shifting line interconnecting the dual channels, into an amplitude difference utilizable on detection to control the direction of travel of a torpedo. Any amplification of the dual signals whose amplitude difference affects control of the torpedo should be equalized in order to maintain accuracy of control. Dual channel time-variation-of-gain amplifiers, however, are hard to track in gain and have previously been equalized by using two amplifiers, controlled in gain by a superimposed side signal or by using a single amplifier that is alternately switched into each channel in rapid succession.

An important object of the present invention is the provision of an automatic steering system utilizing improved phase comparison circuitry for direction control.

Another object of the invention is to provide an improved automatic steering system including a combination of phase comparison circuitry with automatic variable gain amplification.

A further object is to provide a system of the character described with an improved lag line arrangement.

Other objects and advantages of the invention will be apparent during the course of the following detailed description, taken in connection with the accompanying drawing forming a part of this specification and in which drawing;

FIG. 1 is a diagrammatic view of the improved automatic steering system;

FIGS. 2 and 3 are vector diagrams illustrating the operation of the lag line.

In the drawing which for the purpose of illustration shows only a preferred embodiment of the invention, the numeral 10 in FIG. 1 designates the control system including an electroacoustic transducer 11 positioned in the head of a torpedo 12 and connected to a transmitter 13 and a receiver 14. The transmitter 13 comprises an amplifier 15 whose output, under the control of a timing oscillator 16, and consisting of short pulses of high frequency energy separated by listening intervals, is applied to the transducer 11.

The receiver 14 comprises dual channels 17, 18 connected to vertically spaced sections 19, 20 of the transducer 11 and provided with vacuum tube amplifier triodes 21, 22 constituting a first stage of amplification. Submarine echoes and reverberation show a characteristic decrease in magnitude as time increases after each transmitted pulse. Inasmuch as the attenuation is so great that a distant submarine echo is much weaker than close-range reverberation, it is necessary to provide the receiver with means increasing its sensitivity continuously during the listening intervals between transmitted pulses. In the system shown in FIG. 1, this is done by means of a time-variation-of-gain (TVG) circuit 23 connected to the control grids 24, 25 of the dual channel amplifier triodes 21, 22. This TVG circuit 23 may include a condenser 26 adapted to receive a negative grid-biasing voltage during transmission and a discharge resistor 27 adapted to reduce the grid-biasing voltage during each listening period.

Coupled to the plates 28, 29 of the TVG amplifier triodes 21, 22 as by condensers 30, 31 are the control grids 32, 33 of another pair of vacuum tube amplifier triodes 34, 35 constituting a second stage of amplification. In order to reduce any excessive signal strength after the TVG stage, any suitable automatic volume control circuit 36 is connected to the control grids 32, 33 of the dual channel amplifier triodes 34, 35. The plates 37, 38 are of course connected to any suitable source 39 of plate current. The same or another source 40 may energize the cathode-plate circuit of the TVG stage.

The output of the second stage of amplification, taken from the triode plates 37, 38, after processing by a dual rectifier 41, is applied to a comparator bridge 42 adapted to control rudder and elevator circuits 43, 44 including motors 45, 46 for setting the rudders 47, 48 and elevators 49, 50 respectively.

Connected across the dual channels 17, 18 at the plates 28, 29 of the TVG amplification stage is a lag line 51 including a pair of serially connected variable inductances 52, 53 through which plate current for the TVG stage is fed from the source 40. The plates 28, 29 are coupled to ground through condensers 54, 55. If the wave front is advancing from a target below the central axis of the transducer, the output of the upper transducer section 19 to channel 17 will lag behind the output of the lower transducer section 20 to channel 18 although the amplitudes of the separate outputs will not differ substantially. The receiver must distinguish whether the wavefront is coming from a target below or above the central axis of the transducer. The lag line converts phase difference between the high-frequency output of the dual preamplifiers 21, 22 to an amplitude difference between resultant dual waves of unchanged frequency so that the amplitudes may be compared by means of the amplitude comparator bridge 42 and the pitch of the torpedo changed to correspond. While the resultant signals delivered by the lag line arrangement and amplified by amplifier tubes 34, 35 may additionally exhibit phase difference, such relationship is of no consequence to the dual rectifier 41 and to comparator bridge 42 which are responsive only to the amplitude difference characteristic of the signals applied thereto.

It had been proposed previously to use a lag line ahead of the TVG stage. In accordance with the present invention, the lag line is put near the output end of the multiple stage amplifiers, and normally deleterious amplitude differences due to unequal gains of the preceding amplifiers then show up as mere phase differences in the resultant signals applied to the comparator bridge.

The second stage in the illustrated embodiment is not varied much in gain, hence it is satisfactory to put the lag line arrangement in the plate circuit of the TVG stage which inherently is hard to track in gain.

From an inspection of FIG. 1 it will be noted that each plate 28, 29 feeds across the lag line coils 52, 53 to the other plate. The cross feed voltage is not lowered much in amplitude but is lagged in phase an amount which depends on the values of the inductances 52, 53 and capacitors 54, 55. This is a 90° lag line and the vector diagrams of FIGS. 2 and 3 illustrate its action.

In FIG. 2, the dual channel control grid input voltages $e_A$ and $e_B$ are in phase and of equal magnitude. Assuming in this case that the TVG amplifier gains are unequal, the voltages $e_1$ and $e_2$ delivered by the TVG amplifier remain in phase although their magnitudes differ. The resultant $E_1$ is the sum of vector $e_1$ and vector $e_2$ when the latter is lagged 90°. The resultant $E_2$ is the sum of vector $e_2$ and vector $e_1$ when the latter is lagged 90°. In spite of the large difference in gain, the vector diagram shows that the resultants $E_1$ and $E_2$ are equal even though out of phase.

FIG. 3 illustrates a case where the input voltages $e_A$ and $e_B$ are out of phase but of equal magnitude. Assuming that the dual channel amplifier gains are equal, the voltages $e_1$ and $e_2$ introduced by the plates will be out of phase and of equal magnitude. The vectors in this case show that the resultants $E_1$ and $E_2$ are unequal. Thus the original phase difference in the input voltages of the TVG stage is translated into an amplitude difference in the output even though the amplifier gains are equal.

In the particular homing torpedo embodiment illustrated in FIG. 1, steering in depth is provided by a prior art system wherein, by means of a signal-controlled relay (not shown) in the rudder circuit 43, an "on-off" type of homing action takes place, in which the torpedo turns in a given direction (termed an "off" direction) when target signals are received, and control signals correspondingly delivered by comparator bridge 42, until the torpedo points sufficiently away from the target to result in signal loss, whereupon relay switching action causes the torpedo to turn in the opposite direction ("on") toward the target until signals are again received, such on-off action being repetitive and thus causing the torpedo to pursue a sinuous but nevertheless satisfactorily direct course in azimuth toward the target. Steering in depth is of course effected in response to the sense of amplitude difference of the signals delivered by dual rectifier 41 to the comparator bridge 42 which controls elevator circuit 44.

It should be understood, however, that the above torpedo system as illustrated and described is given simply as a typical environment for the present invention which principally concerns an advantageous combination of two-section transducer, TVG amplifier and cross-coupling phase-shifting circuitry in a homing torpedo, wherein inherent unbalanced condition of the TVG amplifier in the said combination will not disturb the translation from a phase-difference characteristic of dual signals as received by the transducer to signals which conveniently identify direction by a corresponding amplitude difference.

From the foregoing it is clear that an automatic electric steering control system including improved phase comparison circuitry has been provided. Various changes may be made in the form of invention herein shown and described without departing from the spirit of the invention or the scope of the following claims.

What is claimed is:

1. In an automatic electric steering system for directing a moving body equipped with steering gear toward a source of pulses of high-frequency signals, spaced transducers operable during listening intervals to generate separate electric oscillations of said signal frequency and having a phase difference varying with the angle of said signal source relative to said oscillation generating transducers, independent time-variation-of-gain amplifiers for amplifying said separate electric oscillations with increasing gain during said listening intervals, phase-shifting means interconnecting the signal frequency outputs of said amplifiers for converting the phase difference between said separate amplified oscillations into an amplitude difference between separate amplified oscillations of said signal frequency, and means responsive to said amplitude difference for controlling said steering gear.

2. In an automatic electric steering system for directing a moving body equipped with steering gear toward a source of pulses of high-frequency signals, a pair of spaced receivers mounted on said body for operation during listening intervals and adapted upon the reception of said high-frequency signals from said source to generate separate electric oscillations corresponding to the frequency and phase difference of said signals, the phase difference between said oscillations varying with the angle of said signal source relative to said spaced receivers, independent time-variation-of-gain amplifiers for amplifying said separate electric oscillations of said signal frequency with increasing gain during said listening intervals, phase-shifting means interconnecting the signal frequency outputs of said amplifiers adapted to shift the phase of a portion of each output and transfer said phase-shifted portion to the other output so that the difference between the resultant amplitudes of said signal frequency outputs is commensurate with the phase difference between said oscillations, and means responsive to said amplitude difference adapted to control said steering gear.

3. In an automatic electric steering system for directing a moving body equipped with steering gear toward a target capable of reflecting high-frequency signals, a high-frequency signal transmitter carried by said body and adapted to emit signal pulses, a pair of spaced receivers mounted on said body and adapted upon the reception of reflected signal pulses from said target during listening intervals to generate separate electric oscillations corresponding to the frequency of said signals, the phase difference between said oscillations varying with the target angle relative to said spaced receivers, independent time-variation-of-gain amplifiers for amplifying said separate electric oscillations with increasing gain during said listening intervals, phase-shifting means interconnecting the outputs of said amplifiers for converting the phase difference between said separate amplified oscillations into an amplitude difference between separate amplified oscillations of said signal frequency, and means responsive to said amplitude difference for controlling said steering gear.

4. In an automatic electroacoustic steering system for directing a moving marine body equipped with steering gear toward a source of underwater sound waves, a pair of spaced electroacoustic transducers mounted on said body and adapted upon the reception of said underwater sound waves during listening intervals to generate separate pulses of electric oscillations corresponding to the frequency of said sound waves, the phase difference between said oscillations varying with the angle of said sound source relative to said spaced receivers, independent time-variation-of-gain amplifiers for amplifying said separate electric oscillations with increasing gain during said listening intervals, phase-shifting means interconnecting the outputs of said amplifiers for converting the phase difference between said separate amplified oscillations into an amplitude difference between separate amplified oscillations of said signal frequency, and means responsive to said amplitude difference for controlling said steering gear.

5. In an automatic electric steering system for directing a moving body equipped with steering gear toward a target capable of reflecting high-frequency signal pulses, a high-frequency signal transmitter carried by said body emitting successive signal pulses, a pair of spaced receivers mounted on said body and adapted upon the reception of said high-frequency signals from said target to generate separate pulses of electric oscillations corresponding to the frequency of said signals, the phase difference between said oscillations varying with the angle of said signal source relative to said spaced receivers, independent time-variation-of-gain preamplifiers for amplifying said separate oscillations with gain increasing with time following successive pulse emissions, phase-shifting means interconnecting the outputs of said preamplifiers adapted to shift the phase of a portion of each output and transfer said phase-shifted portion to the other output so that the difference between the resultant amplitudes of said interconnected outputs of said signal frequency is commensurate with the phase difference between said oscillations, additional independent automatic-volume-control amplifiers for separately amplifying said resultant interconnected outputs of said signal frequency, the gain of said additional amplifiers being low relative to the gain of said preamplifiers, and means responsive to the amplitude difference between said additional amplifier outputs adapted to control said steering gear.

References Cited in the file of this patent

UNITED STATES PATENTS

| | | |
|---|---|---|
| 1,121,563 | Leon | Dec. 15, 1914 |
| 2,166,991 | Guanella | July 25, 1939 |
| 2,349,370 | Orner | May 23, 1944 |
| 2,382,058 | Hull | Aug. 14, 1945 |
| 2,409,632 | King | Oct. 22, 1946 |
| 2,433,991 | Hebb | Jan. 6, 1948 |
| 2,530,528 | Kreer | Nov. 21, 1950 |